F. H. FOLDEN.
CONCRETE BLOCK MACHINE.
APPLICATION FILED SEPT. 3, 1915.

1,226,873.

Patented May 22, 1917.
6 SHEETS—SHEET 1.

WITNESSES:
Morris Nielsen
Ruth Mead.

INVENTOR
Frank H. Folden,
BY Lon. Vaughan,
his ATTORNEY.

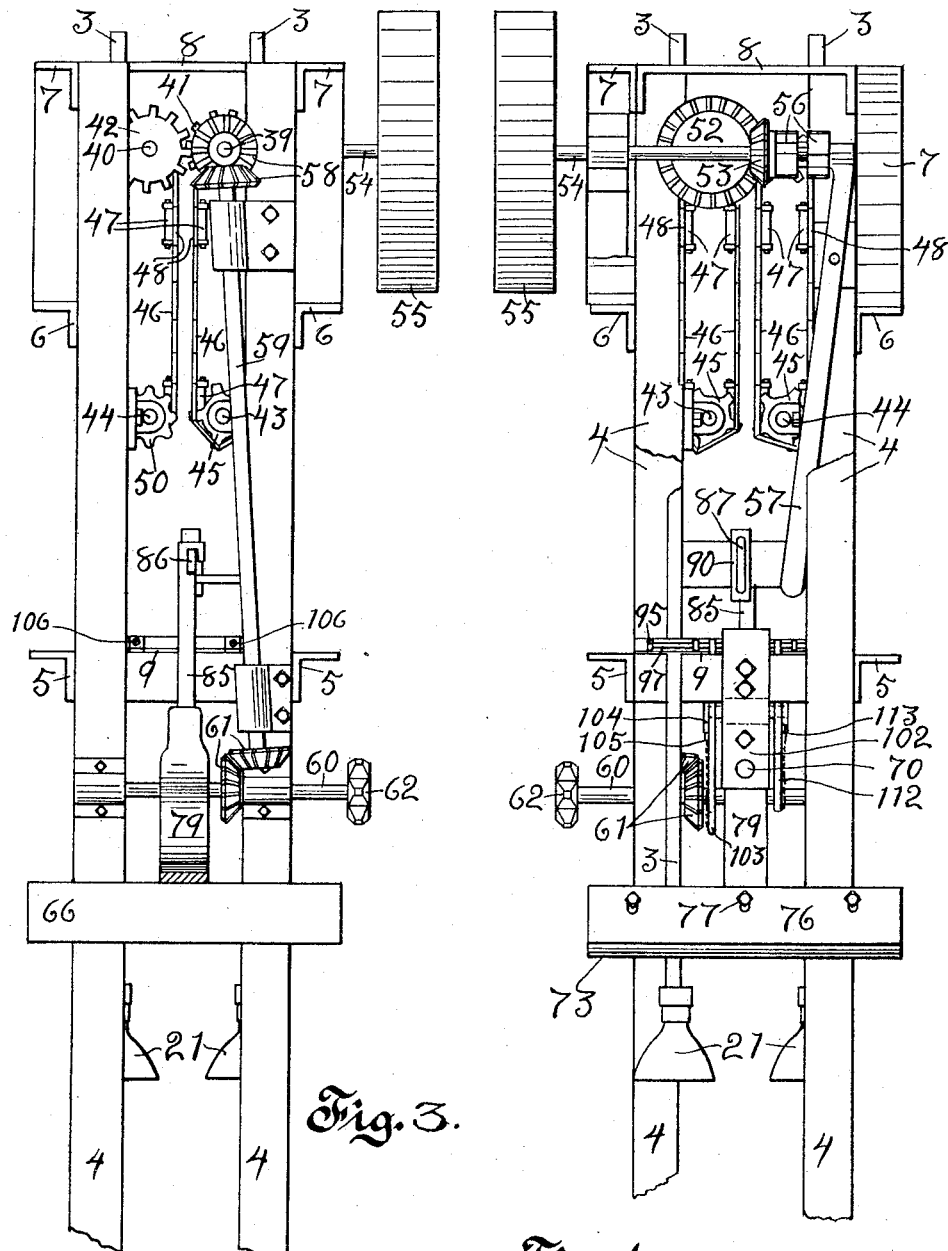

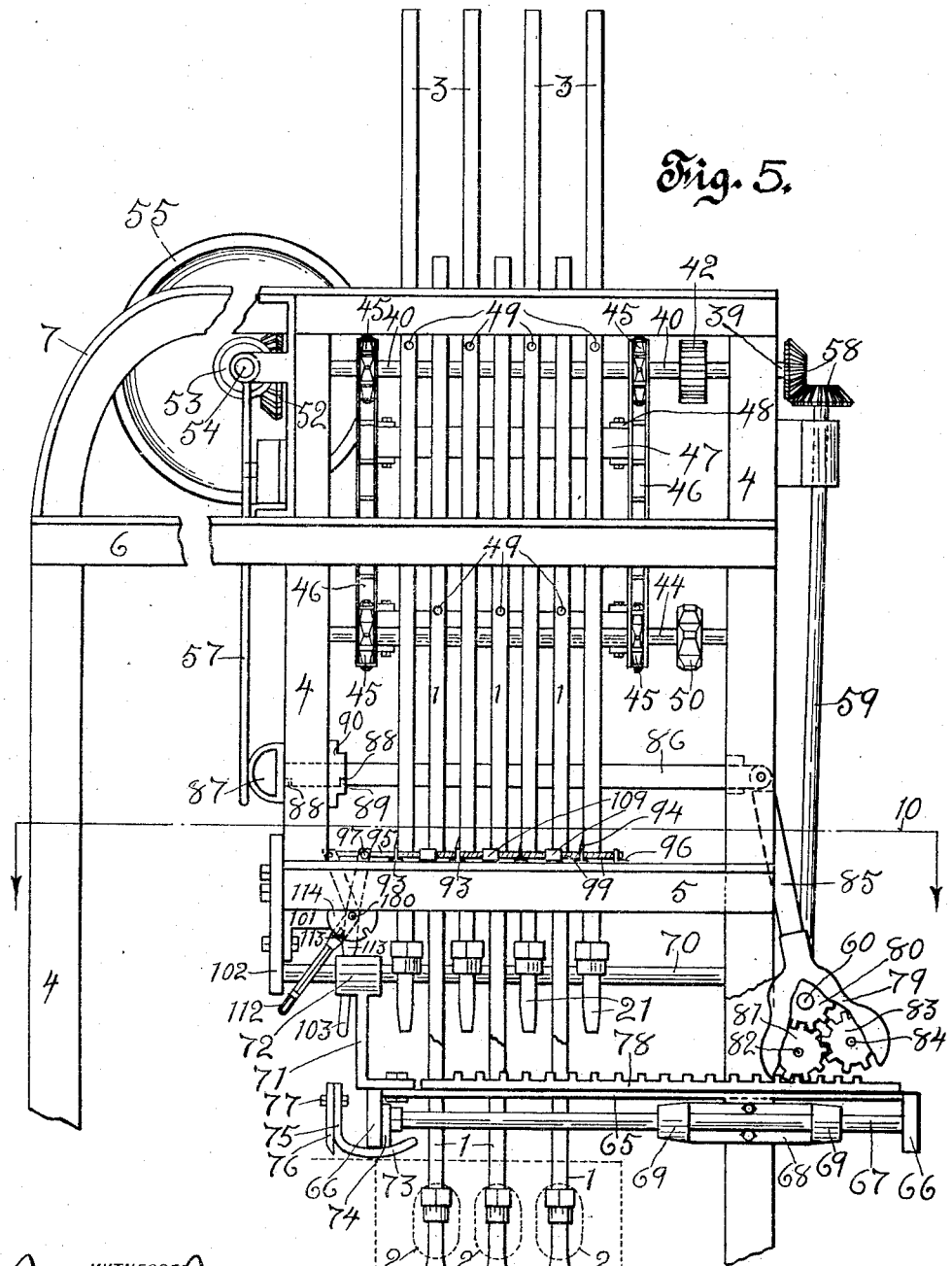

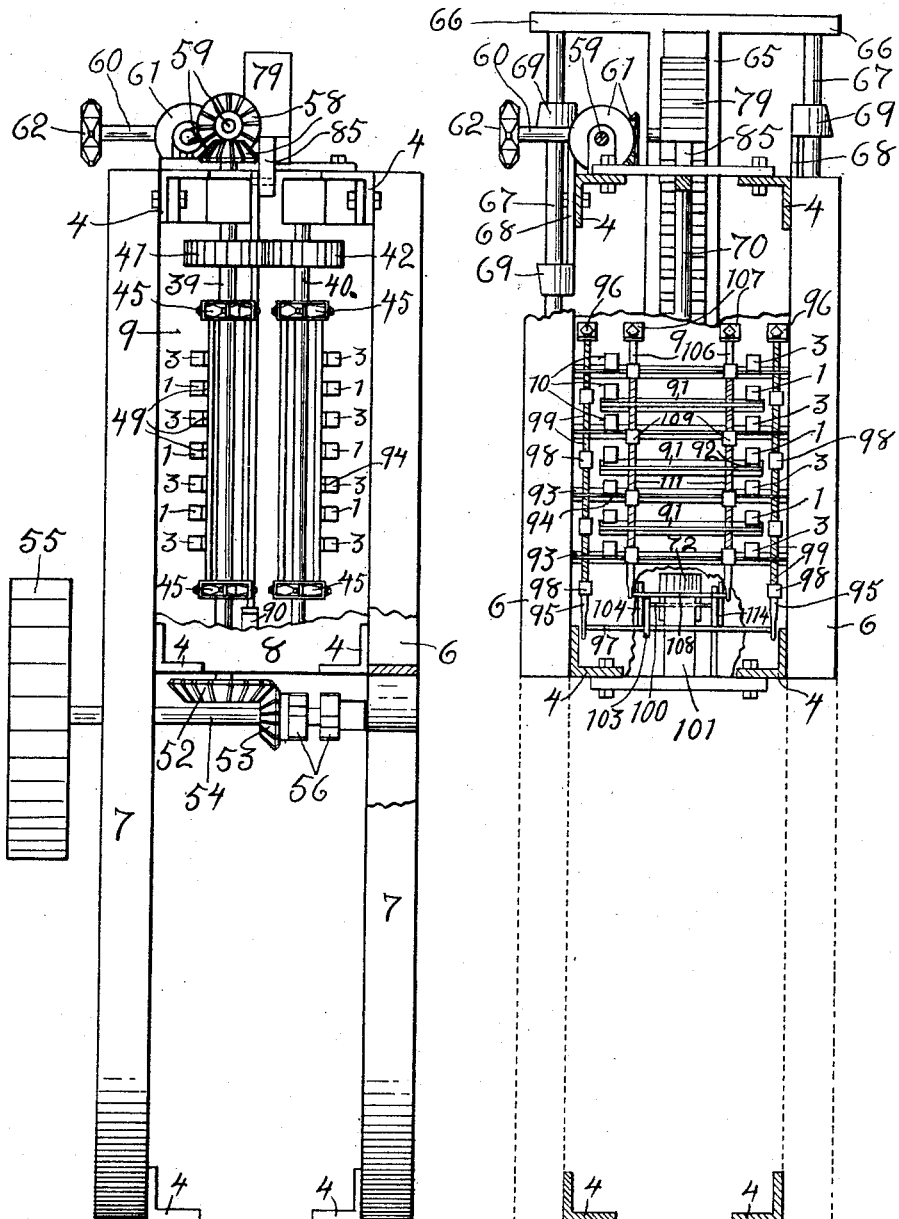

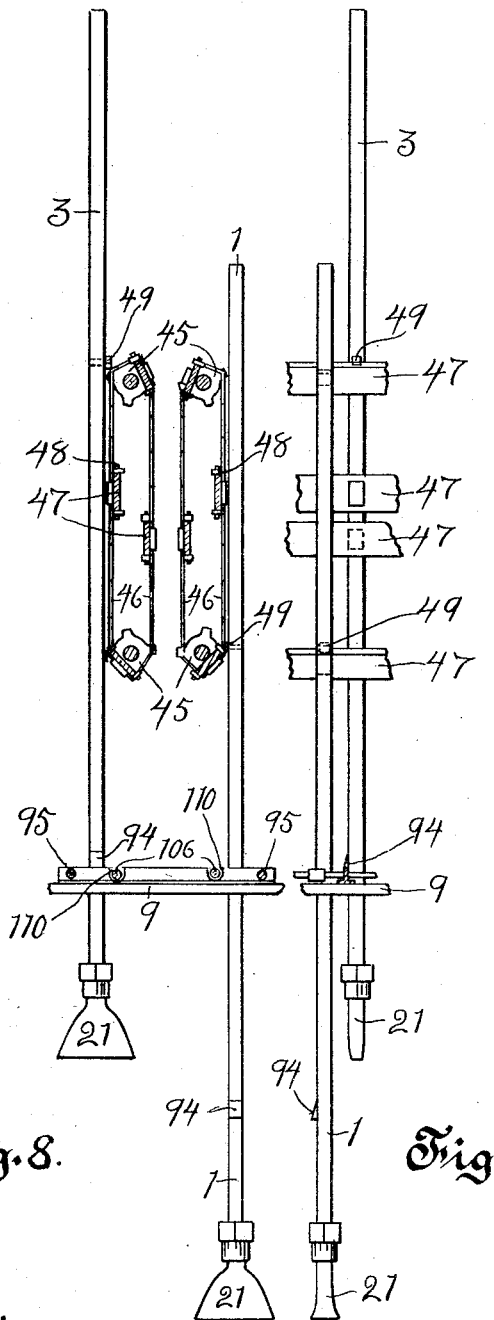

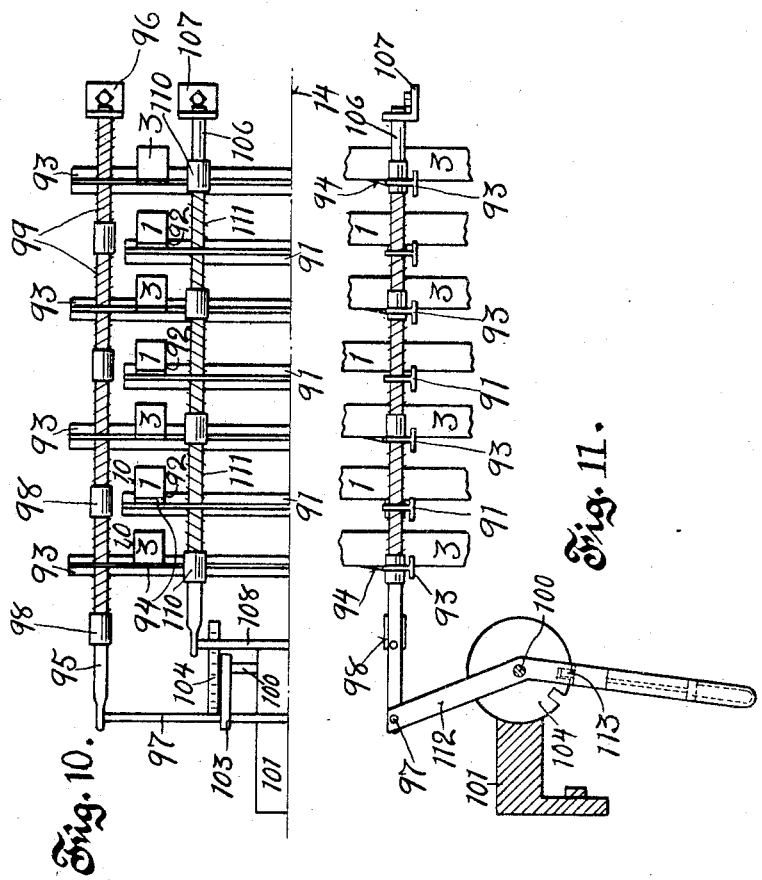

UNITED STATES PATENT OFFICE.

FRANK H. FOLDEN, OF DES MOINES, IOWA.

CONCRETE-BLOCK MACHINE.

1,226,873.

Specification of Letters Patent.   Patented May 22, 1917.

Application filed September 3, 1915.   Serial No. 48,835.

*To all whom it may concern:*

Be it known that I, FRANK H. FOLDEN, a citizen of the United States of America, residing at Des Moines, in the county of Polk and State of Iowa, have invented certain new and useful Improvements in Concrete-Block Machines, of which the following is a specification.

My invention relates to concrete block machines, made double, with juxtaposed molds and opposite delivery, that is, delivery of completed blocks at both ends or sides of the machine; and the objects of my improvement are, first, the combination of machine and gravity-actuated tampers with manual means for modifying the action of any or all of the different sets or series of tampers, to the extent of enabling the operator to stop at will, indefinitely, any or all of said particularly-arranged sets of tampers, without arresting or disturbing the automatic or mechanical action of other parts of the machine; and second, to provide two series of double, spring-actuated detents to releasably engage the tampers, with independent means for manual control of either series, to facilitate attaining the first-named object. All of which objects, with others of minor character, hereinafter more clearly set forth, are attained by the mechanism illustrated in the accompanying drawings, in which—

Figure 2:
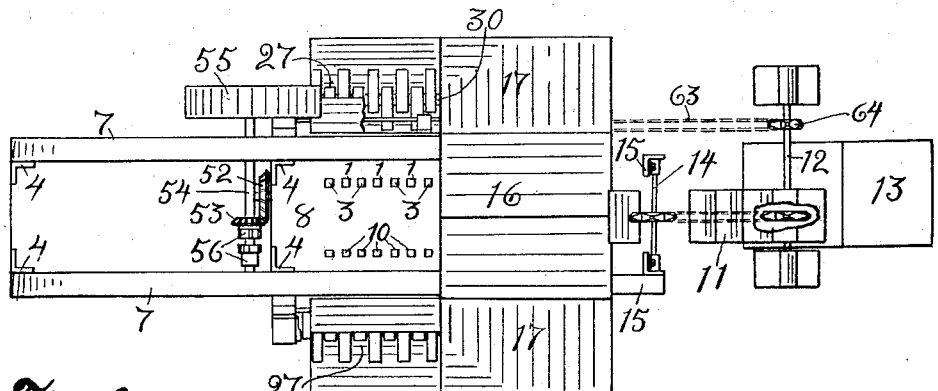
Figure 1:
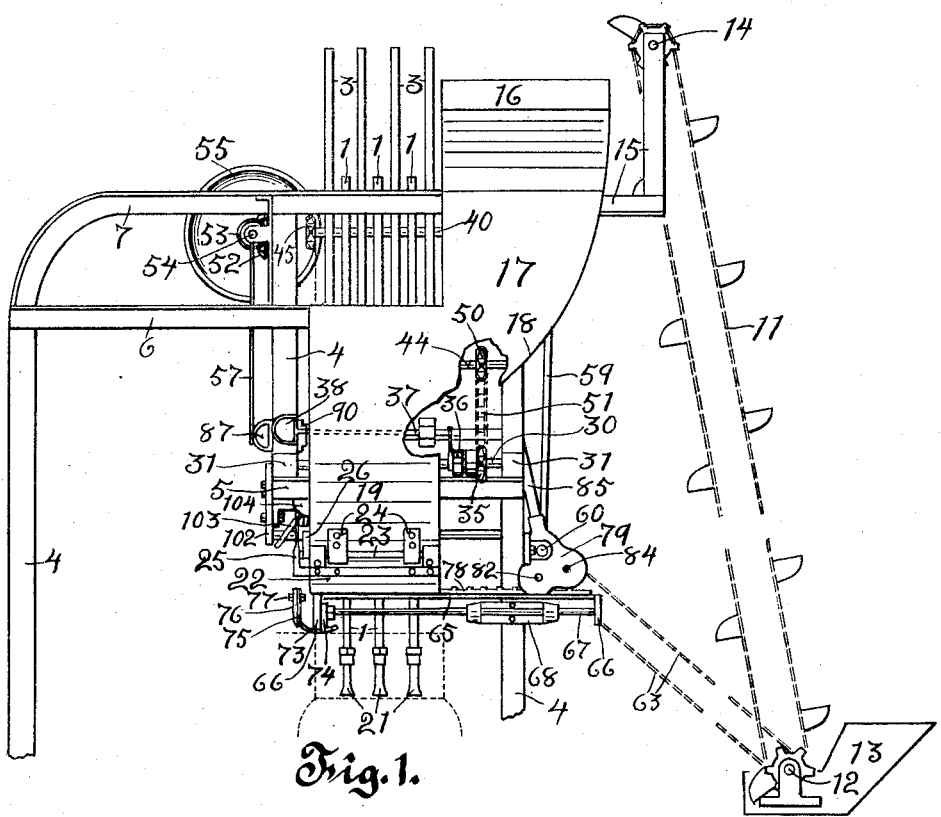

Figure 1 is a side elevation of the whole device, with a part cut away to show the driving mechanism of the concrete feeding contrivance and means to regulate the delivery of the concrete into the molds; Fig. 2 a top view of the same; Fig. 3, a view of the elevator end of the machine, having the elevator removed; Fig. 4, a view of the end of the machine opposite to the elevator and to Fig. 3, with parts cut away to better show the main driving shaft, clutch and other connected mechanism; Fig. 5, a side view of the machine with the elevator and hoppers removed; Fig. 6, a top view of Fig. 5, a small portion cut away to disclose the principal driving gearing and clutch; Fig. 7, a plan on the broken line 10 of Fig. 5 with portions further cut away to disclose the lower parts of the structure; Fig. 8, a fragmental vertical sectional end view, showing the tampers and the tappet movement or lifters by which the tampers are engaged, lifted and released to let them fall; Fig. 9, a fragmental vertical side view of Fig. 8; Fig. 10, a top view showing the arrangement of the double detents for one side or one-half of the machine, to set to automatically engage and hold the tampers out of action, or to set out of engagement with the same; Fig. 11, a vertical sectional view on the central broken line 14 of Fig. 10. In all of which views like reference numerals refer to like parts of the device.

This machine is designed to fill and tamp the concrete into both sides of a double three cored molding machine. Three of the rammers or tampers 1, 1 and 1, on each side work above and on top of the three inserted cores 2, 2 and 2, indicated by dotted lines in Fig. 5; and the other four tampers 3, 3, 3 and 3, are disposed so that their butts work through and above the four spaces, two of which are between the cores and two between the end cores and the end plates of the mold. These last-named tampers have narrow soles by which the butts are rendered laterally wedge-shaped to force the concrete laterally under the inserted cores; while the other three working above the cores have broad soles, to more efficiently assist in ramming down the top or wall-back of the block; this renders the tamping uniform and efficient even when the cores are inserted before the filling is begun. When the cores are omitted, while making solid blocks, the broad soled tampers work clear down to the bottom of the mold, as shown in Fig. 5.

To further facilitate the tamping, the actuating mechanism is supported above the molding machine,—as shown in Figs. 1 and 5,—by angle-bar side frames, each consisting principally of the three uprights 4, the end ones serving as legs and the middle one shortened at the bottom and serving as a hanger or central support; these are connected by the horizontal lower side bars 5, the middle side bar 6 and the bent top and side bar 7. These opposed side frames are connected in spaced relation by a horizontally disposed top guide plate 8 and a bottom guide plate 9, interposed and bolted therebetween to support and guide various other parts of the machine as hereinafter set forth. The stems of the tampers are square in cross section and disposed loosely and vertically through rows of square perforations 10 to retain the laterally elongated butts coincident with the spacing of the cores between the mold ends; this allows the tampers to be freely raised and to fall vertically at predetermined permanent positions, their stems sliding loosely in the square apertures of the guide plate.

The upright tamper bars are arranged in two parallelly-spaced rows,—as shown in Figs. 2, 6, 7 and 10,—one row for each side mold. In the space between these rows of tamper bars, centrally and toward the top of the machine the raising mechanism is disposed. This consists of a pair of top shafts, consisting of a driving shaft 39, and a counter shaft 40, disposed in the same horizontal plane, each spaced from the adjacent row of tamper bars and parallel therewith. These shafts are connected by a pair of equal pinions 41 and 42 causing them to revolve in opposite directions with equal speed. The ends of the shafts are boxed on the vertical members 4 of the machine frame. A similar pair of shafts 43 and 44 are disposed directly beneath, and spaced a suitable distance below the top pair, according with the height to which the tampers are raised at each stroke. Each of these four shafts has mounted thereon to turn therewith two equal sprocket wheels 45 and 45, spaced a distance apart on the shaft to more than span the length of the row of tamper bars on that side. These spocket wheels are so disposed as to bring them in vertical pairs, one of each pair on the lower and one on the upper shaft, making in all four vertically spaced pairs of sprocket wheels. Each vertical pair of sprocket wheels is connected by an endless sprocket chain 46, carried around thereon; and each side pair of chains serve as edge chain-belts in the tamper lifter on that side of the machine and are thus spaced to span laterally the full row of tampers. The opposite chains are connected by the horizontal cross bars 47 spanning the space between the chains and having their ends seated in the specially socketed links 48 of the chains. These bars carried by the chains, upward on the side adjacent to the row of tampers, engage the lugs 49 on the tamper bars to raise them and are spaced around on the chains far enough apart to allow the tampers to make the requisite drop when released by the bar turning from under the lug at the top of the lifter.

Toward the elevator, back of the lifter carriers, the sprocket-wheels 50 are mounted on the lower shafts of the lifters. Driving chains 51 and 51 are disposed from these sprocket wheels, obliquely downward and outward at opposite sides, and around the driven sprocket-wheels 35 mounted loosely on the rear ends of the lower agitator shafts adjacent to the stopping and starting clutches 36.

The live top shaft 39 of the driving-side lifter, is extended at both ends beyond its journal boxings:—The forward end has mounted thereon the bevel gear wheel 52, which is driven by the bevel pinion 53 mounted loosely on the main driving shaft 54 disposed across the forward end of the machine and having mounted on its extended end the belt pulley 55 to take the power requisite to move all the mechanically driven parts of the machine; there is also mounted on this shaft a release clutch 56, operated by the hand lever 57 to engage or release the bevel pinion on the driving shaft.

To provide means for the combined manual and automatic control of the action of the tampers, a system composed of two series of spring-actuated and manually controlled detents are constructed and operated as follows:—The detents are inverted T bars, their flange bases slidingly seated on the lower guide-plate 9 of the tamper bars. For the set of six alternate intermediate tampers 1, 1, etc.,—three on each side, see Fig. 7,—the three shorter T bars 91 are disposed across with end portions of each lapped against the front faces of a pair of tamper bars consisting of one in each side row; and the flanges on the lap sides of the T's have notches 92, to loosely receive the tamper bars against the sides of the upstanding stems of the T's. It will be observed that this series is for those tampers that operate on or above the inserted cores. For the other series of tamper bars 3, 3, etc.,—four on each side, working at spaces between cores and between cores and walls of the molds,—the four alternate longer inverted T bars 93, are employed as follows:—They are disposed across with ends projecting equally beyond the rows of tamper bars at opposite sides and are notched to receive these bars against the stems of the T's in the same manner as the shorter T bars are notched. Each tamper bar has a lug 94 disposed to engage the top of the adjacent detent bar and retain the tamper butt elevated out of the path of the troweler,—see Figs. 5, 8, 9 and 11. This also holds the lugs 49,—at the top of the tamper bar,—at the highest point of engagement by the lifters; leaving the tampers at rest until released by withdrawing the detents from under the lugs 94. The tops of the lugs 94 are each inclined from the face of the bar to the point of the lug, so that the lug slides the detent bar aside in passing upward, but a tamper cannot descend in its regular falling action, unless the detent bar is drawn laterally and retained out of the path of the lug.

To actuate and manipulate the detent bars, a pair of guide rods 95 and 95 are disposed one at each side outside of the row of tamper bars and loosely through cross perforations in the vertical web members of the four longer detent bars. The rear ends of the guide rods are disposed loosely through the supporting-brackets 96 fixed on the tamper guide plate 9. The front ends are connected by a head-bar 97 disposed horizontally across and fastened thereto. Rigidly set collars 98, 98, etc., are spaced evenly on the guide rods, interposed between the detent bars, and one at the same spacing in front of the front detent. Coil compression springs 99, 99, etc., are disposed around the guide rods at all intervening spaces between the collars and detent bars and between the collars and the rear end supporting brackets. These springs hold the detent bars yieldingly in position on the guide rods, but slidable thereon either forward or backward. A fulcrum-rod 100 is supported horizontally across at the front in the bracket 101 bolted to the pendent plate 102 on the machine frame. A bent lever 103, is pivoted at its angle on the fulcrum rod. The top end of the upstanding arm of this lever is perforated to loosely receive the head bar of the guide rods, forming a hinge connection therewith. The pendent part forms a lever arm for the manual endwise reciprocation of the guide rods. A notched disk 104 is set stationarily on the fulcrum-rod and adjacent to the lever. A spring-actuated locking bolt 105, see Fig. 4, on the lever arm engages the notches in the disk to set the lever and attached guide rods at desired positions. The yielding spring connection of the detent bars to the guide rods allows the guide-rods to be reciprocated a greater distance, to take up all lost motion and inequalities of structure and to perfectly seat all of the detent bars with both ends of each either into or out of the paths of the inclined-topped lugs.

A similar pair of guide rods 106 are disposed in a like manner to those above described, but inside of the rows of tamper bars and loosely through end portions of the three shorter detent bars. Their rear ends are longitudinally slidable in the bracket supports 107 and their front ends connected by a head-bar 108. They have rigidly set collars 109 spaced evenly and the four longer detent bars have the curved notches 110 cut through the upstanding webs, to allow these collars to pass loosely through, or to allow the longer detents to shift laterally when these guide-rods are set temporarily stationary. Coiled springs 111 are disposed on these guide rods in a like manner and for a like purpose to those on the outer guide-rods 95. An operating lever 112, is mounted on the same fulcrum-rod 100 as is the lever 103 for the outer guide rods. This lever is in the same manner, connected to the head-bar 108, has a spring locking bolt 113 and a notched disk 114, all mounted and operating in the same manner as those for the outer guide rods.

In operation, if the guide rods of either series of detents are set to the farthest limit forward, the tampers of that series will act unobstructedly, rising and falling by the action of the lifters and gravity. Reversely, if set at the backward limit, the tampers, if down, will rise once; the yielding detents allowing the inclined-topped lugs to pass up, but not to descend until released by shifting the guide-rods forwardly to move the detents out of the paths of the lugs.

I claim:

1. In mechanism of the kind described, the combination of two rows of vertically acting tamper bars disposed in laterally-spaced relation, detent bars disposed across the space, each detent bar athwart a pair of tamper bars one of the pair being in each row, and an inclined topped lug on the side of each tamper bar adjacent to the detent bars.

2. In mechanism of the kind described, the combination of two rows of tamper bars disposed in spaced relation and the bars spaced in the rows, detent bars disposed across, each athwart a pair of tamper bars, one in each row, guide rods disposed transversely through the detent bars, fixed collars mounted on the guide rods intermediately of the detent bars, coil springs interposed on the guide rods between the collars and the detent bars and downwardly hooked lugs on the tamper bars to engage the detent bars.

3. In mechanism of the kind described, the combination with vertically disposed and reciprocating tamper bars having engagement lugs, of horizontal detent bars disposed athwart the tamper bars and laterally shiftable out of and into the paths of the lugs, longitudinally-reciprocating guide rods disposed transversely through the detent bars, a yielding connection of the detent bars to the guide rods and a head-bar connected to the guide rods.

4. In mechanism of the kind described, the combination of two rows of vertically-endwise reciprocating tamper bars disposed in laterally spaced relation, each row consisting of two series of tamper bars, the individual bars of each series disposed alternately with the bars of the other series in spaced relation throughout the row, and tamper butts on the tamper bars of each series, peculiar to the service of that series and different from the butts on the bars of the other series in the row, support lugs on the tamper bars, a series of horizontal detent bars each bar disposed across the space between the rows of tamper bars and its ends set to engage the lugs of corresponding tamper bars in like series of opposite rows and this series of detent bars connected to simultaneously detain or release all the tamper bars of like series in both rows, and a like series of detent bars of the same construction and connection disposed to detain or release all the tamper bars of the other series in both rows.

In testimony whereof I have affixed my signature in presence of two witnesses.

FRANK H. FOLDEN.

Witnesses:
JAMES PARKER,
SARA LA VINE.